United States Patent Office 2,885,859
Patented May 12, 1959

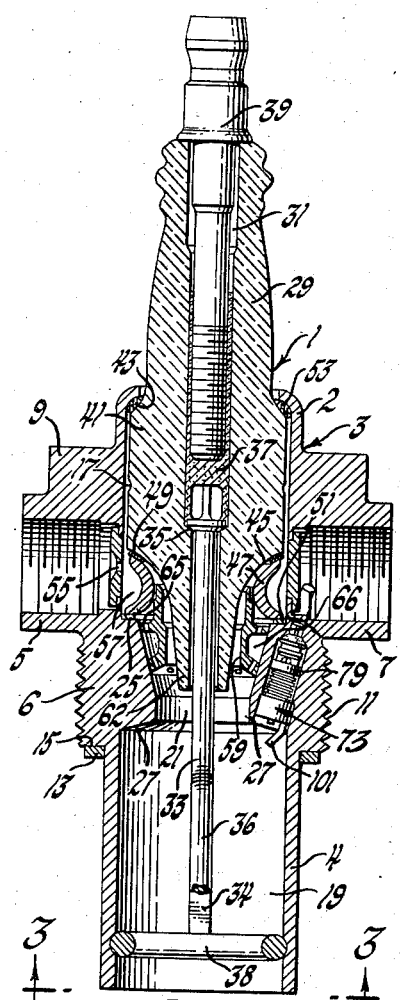

2,885,859

INJECTOR IGNITER PLUG

Fortunato Barberis, Flint, Mich., assignor to General Motors Corporation, Detroit, Mich., a corporation of Delaware Application April 30, 1954, Serial No. 426,735

14 Claims. (Cl. 60—39.82)

This invention relates to injector igniter plugs for gas turbine engines and more particularly, though not exclusively, to injector igniter plugs for use in aircraft turbine engines.

Gas turbine engines commonly employ a main fuel injector and air compressor adjacent the combustion chamber and turbine for the purpose of accomplishing the desired air fuel mixture and for generating the desired power. One of the problems associated with the use of gas turbine engines in aircraft is the provision of an igniter system capable of functioning to enable in-flight re-ignition of the flame in the combustion chamber, it having been found that certain flight conditions tend to extinguish the fire therein, a condition commonly referred to as a "flame out."

In an attempt to overcome this problem the engines have been provided with an auxiliary fuel and air system working through an injector type igniter plug which is so constructed as to provide and ignite an ideal air-fuel mixture which is projected as a torch-like flame into the main combustion chamber. The re-ignition devices which are known in the art today tend to be both complex and expensive, and by reason of their complexity, subject to failure when called upon in an emergency.

It is therefore an object of my invention to provide an improved injector igniter plug of simple and inexpensive construction. It is another object of my invention to provide an injector igniter plug which is adapted to produce a fully atomized and intermixed optimum fuel air mixture for assuring attainment of a pilot flame for re-ignition of the main combustion fuel mixture regardless of the atmospheric conditions existing in the combustion chamber. It is another object of my invention to provide an injector igniter plug wherein a portion of the plug body absorbs and stores sufficient heat to induce continuous combustion of the pilot fuel mixture and eliminate the need for continuous sparking during the starting period. It is another object of my invention to provide an injector igniter plug especially constructed to assure substantially complete removal of foreign matter from the fuel supplied thereto. It is yet another object of my invention to provide an injector igniter plug especially constructed to utilize the high pressure air feed for both warming the plug on starting at low temperatures and for cooling the plug during the starting operation.

To attain these objects I provide a plug body having means for baffling and by-passing the pilot air stream to reduce the pressure thereof and insulate the plug structure from the heat of the pilot flame, structure being also provided for feeding the air stream in a spiral path opposite to the path of atomized metered and filtered fuel. The pilot flame is self-sustaining by reason of the location of a heat storing mass in the ejection end of the plug.

Further objects and advantages of the present invention will be apparent from the following description, reference being had to the accompanying drawing, wherein a preferred form of the present invention is clearly shown.

In the drawing:

Figure 1 is a vertical sectional view of my improved injector igniter plug;

Figure 2 is an enlarged sectional view of that portion of Figure 1 showing the metering and filtering valve and the air baffling and by-passing structure;

Figure 3 is an end view of the plug taken on line 3—3 of Figure 1;

Figure 4 is a sectional view with parts broken away of the air by-pass taken on line 4—4 of Figure 3;

Figure 5 is a sectional view through the fuel valve taken on line 5—5 of Figure 2.

Referring now to the drawing and more particularly to Figure 1, there is shown an injector igniter plug 1 comprising a substantially tubular shell 3 having an upper portion 2, a lower portion 4 and an intermediate portion 6, the shell being further provided with a pair of threaded bossess 5 and 7 on the upper portion thereof for enabling the connection thereto, respectively, of an air and fuel line, not shown. A hexagonally-shaped flange 9 and a plurality of external threads 11 are provided on the upper portion 2 and intermediate portion 6, respectively, to enable the plug 1 to be secured in the engine. A gas-tight connection is assured by the use of a sealing gasket 13, i.e., nickel, copper, etc., positioned on a shoulder 15 at the bottom of the intermediate portion 6.

The shell 3 is provided with an upper bore 17 and a lower bore 19 which are in axial alignment with each other and with the axis of the shell. The bores 17 and 19 are interconnected by a substantially frusto-conical shaped passage 21 through the intermediate portion 6, the passage being axially aligned with the shell 3. The small diameter end of the passage 21 is adjacent the lower bore 19 thus forming a venturi-like fluid passage, the lower portion of the shell 3 constituting the diffuser section. The passage 21 is stepped with respect to both the upper bore 17 and the lower bore 19 thus forming an upper ledge 25 and a lower ledge 27 in the shell 3, the purposes therefore being more fully described hereinafter.

Positioned within the upper bore 17 is an insulator 29 formed preferably of sintered aluminum oxides, other type materials being possible, and being secured in gas-tight relationship with the shell 3. The insulator 29 is provided with a stepped centerbore 31 adapted to receive and position a center electrode 33 on the ledge 35 formed therein. The electrode 33 may be formed of any suitable material capable of withstanding high temperatures, for example, a nickel-steel alloy, and extends down from the tip of the insulator 29 to a position adjacent the lower edge of the shell 3. As is shown in Figures 1 and 3, the end of the electrode 33 is bifurcated, the thus formed legs 34 and 36 being spread apart to points opposite each other and adjacent ring 38 which forms the ground electrode together with the shell 3. Positioned in the centerbore 31 and overlying the electrode 33 is the conductive seal 37 having good electrical contact with the electrode and with the terminal screw 39 positioned in the upper portion of the centerbore. The seal 37 forms a gas-tight connection with the insulator 29 and may be formed of any suitable material capable of being bonded to the insulator and possessing good electrical conductivity. I prefer to use a mixture of glass and conducting material as described and claimed in the Schwartzwalder and Kirk Patent 2,106,578 granted January 25, 1938 and the Schwartzwalder and Rulka Patent 2,248,415 granted July 8, 1941.

The insulator 29 is formed with a large diameter portion 41 intermedaite its ends thus presenting an upper shoulder 43 and a lower shoulder 45 which are effective to seal the insulator within the shell 3. An annular C spring 47, formed of spring steel, is positioned between the insulator shoulder 45 and the ledge 25 formed in the shell 3 and acts therebetween, upon application of axial force to the insulator 29, to produce the desired gas-tight seal of the plug. To assure the integrity of the seal and the even distribution of force on the bearing surfaces, gaskets 49 and 51, made of copper, nickel or other suitable material, are interposed between the shoulder 45 and the ledge 25 and the upper and lower ends of the spring 47, respectively. The spring 47 may be stressed in any suitable manner to seal the plug 1, the method shown in Figure 1 being to crimp the upper edge of the shell 3 onto the upper insulator shoulder 43, a gasket 53 being interposed therebetween to assure the integrity of the seal and the even distribution of force. The gasket 53 may be formed of any suitable material such as aluminum, copper, nickel, etc.

As is clearly shown in Figure 1, the air inlet 5 is positioned in the upper portion 2 of the shell 3 and is adapted to deliver a metered stream of air to the plug 1 from a high pressure air storage tank not shown on the drawing. The air feed stream is metered and dropped sharply in pressure on being passed through a calibrated orifice plate or nozzle 55 into the annular passage 57 defined by the shell 3, the insulator 29 and the spring 47.

In order to assure the accurate location of the spring 47 on the ledge 25, a collar-like element 59 is positioned on the finished conical wall surface of the intermediate portion 6. The top portion 61 of the collar is provided with vertical knurls 68, as is clearly shown on Figure 2, and is in contact with the inner surface of spring 47 when the plug 1 is completely assembled. The vertical knurls provide a plurality of air passages around the spring 47 in a manner and for the purposes more fully set forth hereinafter. As is also best shown on Figure 2, the collar 59 is spaced from the tapered insulator tip 62 and is provided with a pair of annular outwardly extending flanges 63 and 65 at the bottom and intermediate portion thereof. The flange end surfaces are accurately machined and finished to form a substantially gas-tight seal with the conical wall surface of the shell 3 thus defining a header chamber 66 therewith. As is best shown in Figure 4, the air passage 57 is interconnected with chamber 66 by a pair of intersecting passages 58 and 60 drilled in the intermediate portion 6 of the shell 3. Two such pairs of passages are preferred in order to obtain balanced pressures and air flow in the system. As is shown in Figure 3, both pairs of passages are located opposite the air inlet boss 5, one an each side of the fuel inlet boss 7 in order to permit balancing of the system and the location of the fuel inlet.

The flanges 63 and 65 are each provided with a plurality of spaced apart apertures 67 and 69, respectively. The apertures 67 are formed in flange 63 at a predetermined angle such as to direct the air stream inwardly and in a spiralling direction of movement. The apertures 69 act to by-pass a portion of the air from the chamber 66 around the inner surface of the spring 47 and down through the annular passage 71 between the collar 59 and the insulator tip 62. The path of air flow through the plug 1 is shown on Figure 1 by means of the arrows.

At this point it should be noted that by the relatively simple and inexpensive structure described above, I am able to use an auxiliary air supply maintained under very high pressures thus assuring an adequate supply for emergency requirements while, at the same time, I am able to baffle the air and reduce its pressure in a series of steps thus insuring that the flame injected into the combustion chamber of the engine will not be blown out by reason of the energy of the air jets. Likewise, by conducting the air stream around both sides of the spring steel sealing member 47 and through the passage formed by the insulator tip 62 and the collar 59, I am able to both preheat the air, quench the flame at the insulator and insulate the C spring from the heat of the igniter flame thus precluding loss of temper with attendant loss in sealing pressure. The efficient operation of the plug is further insured by the angular relationship of apertures 67 in flange 63 which produce a whirling stream of air with resulting turbulence and the efficient intermixture thereof with the fuel stream.

The fuel for plug 1 is furnished from the auxiliary fuel tank, not shown, to the fuel inlet boss 7. As is best shown in Figure 2, the fuel valve 73 is formed by providing the intermediate portion 6 of the shell 3 with a stepped bore 75 passing therethrough from the lower shoulder 27 to the fuel inlet 7, the small diameter portion 77 connecting with the inlet. The wall surfaces of the bore 75 are accurately machined and finished for the purposes fully described hereinafter. Positioned within the bore 77 is a tubular valve plunger 79 having a guide stem 81 slidably positioned in the bore 77. The stem 81 is provided with a plurality of equally spaced vertical flats 83 which form fuel passages through the bore when the plunger is in open position. An annular rubber-like sealing disk 85 is positioned on the shoulder 87 formed by the top surface of the valve plunger 79. The disk 85 is formed of any suitable rubber-like material such as Perbunan (Buna-N), a co-polymer of butadiene and acrylonitrile, capable of withstanding the chemical action of the fuel as well as temperatures of from —60° F. to +220° F. As shown in Figure 2, the disk 85 acts to stop the flow of fuel when in abutment with ledge 89 in the bore 75.

As is clearly shown in Figure 2, plunger 79 is of smaller diameter than that of the portion of the bore 75 in which it is mounted and it is therefore necessary to provide the plunger with an annular flange 91 which is in very close sliding contact with the wall of the bore. The flange 91 also serves to block the flow of fuel from around the plunger 79 and redirect it to the bore 92 formed in center thereof through a pair of ports 93 positioned substantially tangential to the inner wall surface of the plunger. The fuel is thus caused to pass through to the nozzle 95 in a spiral path, the centrifugal force generated thereby acting to throw the particles of solids contained therein to the wall surface and out of the direct line of flow to the nozzle which projects axially up into the centerbore of the plunger 79. A second annular flange 97 is formed on the outer surface of the plunger 79 at a point between the top thereof and the flange 91. The flange 97 acts as a primary filter element in that its clearance from the wall of the bore 75 is such as to permit only the very smallest of solid particles, i.e., less than 0.002", to pass through.

The nozzle 95, formed of exceedingly fine metal tubing, i.e., hypodermic tubing of the desired diameter, is secured within a plug 99 positioned within the lower end of the bore 75, the plug having a target prong 101 formed integrally therewith on its lower surface. The metered fuel stream injected through the nozzle 95 impinges on the target 101 and is atomized and spread across the lower bore 19. At this point it should be noted that the valve bore 75 and the nozzle 95 are so located in the shell 3 as to direct the stream of atomized fuel in a spiral direction opposite to that of the air stream. In this manner, turbulent action of the two fluid streams and substantially perfect intermixture thereof is obtained, a condition necessary to assure the prompt ignition of the mixture. A counterbore 103 is formed in the upper surface of the plug 99 and about nozzle 95 and serves as a sump for those solid particles separated out of the fuel stream by centrifugal action. The valve plunger 79 is urged into normally closed position by a coil spring 105 acting between the upper surface of plug 99 and the lower surface of the flange 91, the spring being of such size as to require a fuel pressure of about 30 p.s.i. before the valve would open.

When the plug of my invention is installed in the engine, the lower edge of the shell 3 is flush with the wall of the combustion chamber, not shown, while the gasket 13 abuts the outer wall of the engine casing. In this manner, the plug 1 is independent of the atmospheric conditions which result in "flame-out," the combustion air being supplied by an independent source. When called upon to re-ignite the main combustion mixture of the engine, my plug will operate on spark discharge for a period of about one-half second during which time the pilot fuel-air mixture will have been ignited and sufficient heat stored in the igniter ring 38, formed of Inconel, a nickel-steel alloy, or other suitable metal, to enable the spark ignition to be cut off, the pilot fuel-air mixture being thereafter ignited by the heat stored in the ring. It should be noted that the preheating of the air through baffling and by-passing around the insulator portions 41 and 62 and around the C spring 47 contribute materially to enabling the early cut off of sparking and reliance solely upon flash ignition of the pilot combustible mixture. Likewise, the substantially complete atomization of the fuel and intermixture thereof with the air stream contribute greatly to such action. The step-wise depressuring and baffling action to which the air stream is subjected acts to convert a portion of the energy therein into heat which enables rapid starting under extremely low temperature conditions.

While but a single embodiment is shown and disclosed herein, it is apparent that certain changes and modifications may be made without departing from the invention. For example, the fluid inlet connectors may be made angularly adjustable about the shell 3. Also, the guiding and blocking flange 91 may be replaced by a rubber-like sealing ring and the insulator 29 may be sealed within the shell 3 in any other suitable manner well known in the art, i.e., "Cico" welding. It is therefore to be understood that it is not intended to limit the invention to the single embodiment shown but that the invention is to be limited instead only by the scope of the claims which follow.

I claim:

1. In combination a tubular metal shell, a ledge formed within said shell, an insulator positioned in gas-tight relationship with said shell and having upper and lower shoulders formed thereon and a bore therethrough, the upper end of said shell being formed over onto said upper insulator shoulder, a center electrode positioned within said bore, annular means positioned on the inner wall surface of said shell intermediate the ends thereof and being adapted to form an air chamber provided with a plurality of spaced apart upper and lower apertures, the lower apertures being formed at an angle such as to direct the air in a plurality of inwardly directed and spiralling streams, a sealing gasket provided on the upper and lower insulator shoulders to insure the gas-tight seal thereof within the shell and to form an annular air passage between said shell and said insulator, an air inlet formed on said upper shell portion, means for depressuring and metering the air into the annular passage, said passage being interconnected with said chamber, a fuel inlet provided on the upper portion of said shell, said fuel inlet being interconnected with the lower shell portion, normally closed valve means in said bore for controlling the flow of fuel, fuel metering means associated with said valve means for enabling the proper proportioning of fuel to air, and means for atomizing the fuel jet, the stepped bore being formed at such an angle in said shell as to direct the fuel jet inwardly and in a spiral opposite to that of the air streams.

2. In combination a tubular metal shell, a ledge formed within said shell, an insulator positioned in gas-tight relationship with said shell and having upper and lower shoulders formed thereon and a bore therethrough, the upper end of said shell being formed over onto said upper insulator shoulder, a center electrode positioned within said bore, annular means positioned on the inner wall surface of said shell intermediate the ends thereof and forming an air chamber with the inner wall surface of said shell, the upper and lower walls of the chamber being provided with a plurality of spaced apart apertures, the lower apertures being formed at an angle such as to direct the air in a plurality of inwardly directed and spiralling streams, a sealing gasket provided on the upper and lower insulator shoulders to insure the gas-tight seal thereof within the shell and to form an annular air passage between said shell and said insulator, an air inlet formed on said upper shell portion, means for depressuring and metering the air into the annular passage, the passage being interconnected with the chamber, a fuel inlet provided on the upper portion of said shell, said fuel inlet being interconnected with the lower shell portion by means of a stepped bore provided in said shell, normally closed valve means in said bore for controlling the flow of fuel, fuel metering means associated with said valve means for enabling the proper proportioning of fuel to air, and means for atomizing the fuel jet, the stepped bore being formed at such an angle in said shell as to direct the fuel jet inwardly and in a spiral opposite to that of the air streams.

3. In combination a tubular metal shell, a ledge formed within said shell, an insulator positioned within and in gas-tight relationship with said shell and having upper and lower shoulders formed thereon and a bore therethrough, the upper end of said shell being formed over onto said upper insulator shoulder, a center electrode positioned within said bore, means for storing heat positioned on the lower wall of the shell adjacent the end of said electrode, annular means positioned on the inner wall surface of said shell intermediate the ends thereof and having a plurality of passages formed adjacent its upper end, said annular means forming an air chamber with the inner wall surface of said shell, the upper and lower walls of the chamber being provided with a plurality of spaced apart apertures, the lower apertures being formed at an angle such as to direct the air in a plurality of inwardly directed and spiralling streams, a sealing gasket provided on the upper and lower insulator shoulders to insure the gas-tight seal thereof within the shell and to form an annular air passage between said shell and said insulator, an air inlet formed on said upper shell portion, means for depressuring and metering the air into the annular passage, the passage being interconnected with the chamber, a fuel inlet provided on the upper portion of said shell, said fuel inlet being interconnected with the lower shell portion by means of a bore provided in said shell, normally closed valve means positioned in the bore for controlling the flow of fuel, means for plugging the lower end of said bore, fuel metering means positioned in said last-mentioned means for enabling the proper proportioning of fuel to air, and means for atomizing the fuel jet, the stepped bore being formed at such an angle in said shell as to direct the fuel jet inwardly and in a spiral opposite to that of the air streams.

4. In a device of the type disclosed, a tubular metal shell, the internal surface of the intermediate portion thereof being stepped with respect to the upper and lower portions to form an upper and lower ledge on the respective ends of said intermediate portion, an insulator having upper and lower shoulders formed thereon positioned within said shell and having a bore therethrough, the upper end of said shell being formed over onto said upper insulator shoulder, a center electrode within said bore, a collar positioned on the inner wall surface of said intermediate portion and having a plurality of passages formed adjacent its upper end, a pair of vertically spaced outwardly extending annular flanges formed on said collar, each flange being provided with a plurality of spaced apart apertures and forming an air chamber with said collar and said wall surface, the apertures in the lower-most flange being so positioned as to direct the air in a plurality of inwardly directed spiralling streams, a sealing gasket provided on said upper ledge and said upper insulator shoulder to insure a gas-tight seal thus providing an annular air passage between said insulator and said shell, an air inlet connector positioned on said upper shell portion, a nozzle positioned in said connector for lowering the pressure of and for metering the air into the annular passage, the annular passage and the air chamber being interconnected, a fuel inlet connector positioned on said upper shell portion and being interconnected with said lower shell portion by a bore in said shell, normally closed valve means positioned in the bore, filter means provided in the bore for removing solid particles from the fuel, and means for atomizing the fuel supplied to said lower shell portion, the stepped bore being formed at such an angle in said shell as to direct the fuel jet inwardly and in a spiral opposite to that of the air streams.

5. In a device of the type disclosed, a tubular metal shell, the internal surface of the intermediate portion thereof being stepped with respect to the upper and lower portions to form an upper and lower ledge on the respective ends of said intermediate portion, an insulator having upper and lower shoulders formed thereon positioned within said shell and having a bore therethrough, the upper end of said shell being formed over onto said upper insulator shoulder, a center electrode within said bore, a collar positioned on the inner wall surface of said intermediate portion and having a plurality of passages formed adjacent its upper end, a pair of vertically spaced outwardly extending annular flanges formed on said collar, each flange being provided with a plurality of spaced apart apertures and forming an air chamber with said collar and said wall surface, the apertures in the lowermost flange being so positioned as to direct the air in a plurality of inwardly directed spiralling streams, an annular sealing member positioned within said shell and acting between said upper ledge and said lower insulator shoulder to seal said insulator within said shell, a sealing gasket provided on said upper ledge and said upper insulator shoulder to insure a gas-tight seal thus providing an annular air passage between said insulator and said shell, an air inlet connector positioned on said upper shell portion, a nozzle positioned in said connector for lowering the pressure of and for metering the air into the annular passage, the annular passage and the air chamber being interconnected, a fuel inlet connector positioned on said upper shell portion and being interconnected with said lower shell portion by a bore in said shell, normally closed valve means positioned in the bore, filter means provided in the bore for removing solid particles from the fuel, and means for atomizing the fuel supplied to said lower shell portion, the stepped bore being formed at such an angle in said shell as to direct the fuel jet inwardly and in a spiral opposite to that of the air streams.

6. In a device of the type disclosed, a tubular metal shell, the internal surface of the intermediate portion thereof being stepped with respect to the upper and lower portions to form an upper and lower ledge on the respective ends of said intermediate portion, an insulator having upper and lower shoulders formed thereon positioned within said shell and having a bore therethrough, the upper end of said shell being formed over onto said upper insulator shoulder, a center electrode within said bore, an igniter ring positioned in the wall of said shell adjacent the end of said electrode, annular means positioned on the inner wall surface of said intermediate portion and having a plurality of passages formed adjacent its upper end, said annular means forming an air chamber with said wall surface, the upper and lower walls of the chamber being provided with a plurality of apertures, the apertures in the lower wall being so positioned as to direct the air in a plurality of inwardly directed spiralling streams, an annular sealing member positioned within said shell and acting between said upper ledge and said lower insulator shoulder to seal said insulator within said shell, a sealing gasket provided on said upper ledge and said upper and lower insulator shoulders to insure a gas-tight seal thus providing an annular air passage between said insulator, said member and said shell, an air inlet connector positioned on said upper shell portion, a nozzle positioned in said connector for lowering the pressure of and for metering the air into the annular passage, the annular passage and the air chamber being interconnected, a fuel inlet connector positioned on said upper shell portion and being interconnected with said lower shell portion by a stepped bore, a tubular valve plunger slidably positioned within the bore, a sealing gasket positioned on the upper end of said plunger for abutment with a ledge formed within the bore, means provided on said plunger intermediate its ends and in close sliding contact with the bore wall surface to guide said plunger and block the flow of fuel, said tubular plunger being provided with a plurality of ports to enable the fuel to pass from between the plunger and the bore wall to the inner portion of the plunger, the ports being positioned substantially tangential to the inner wall surface of said plunger to enable the separation by centrifugal action of solids present in the fuel, means plugging the lower end of the bore and having a fuel metering nozzle positioned therein, resilient means positioned about the lower end of said plunger and acting on said plugging means to maintain the fuel valve in normally closed position, and a target in line with and spaced from said nozzle to atomize the fuel jet, the stepped bore being formed at such an angle in said shell as to direct the fuel jet inwardly and in a spiral opposite to that of the air streams.

7. In a device of the type disclosed, a tubular metal shell, the internal surface of the intermediate portion thereof being stepped with respect to the upper and lower portions to form an upper and lower ledge on the respective ends of said intermediate portion, an insulator having upper and lower shoulders formed thereon positioned within said shell and having a bore therethrough, the upper end of said shell being formed over onto said upper insulator shoulder, a center electrode positioned within said bore, an igniter ring positioned in the wall of said shell adjacent the end of said electrode, a collar positioned on the inner wall surface of said intermediate portion and having a plurality of passages formed adjacent its upper end, a pair of vertically spaced outwardly extending annular flanges provided on said collar and forming an air chamber with said collar and said wall surface, each flange being provided with a plurality of spaced apart apertures, the apertures in the lower-most flange being so positioned as to direct the air in a plurality of inwardly directed spiralling streams, an annular sealing member positioned within said shell and acting between said upper ledge and said lower insulator shoulder to seal said insulator within said shell, a sealing gasket provided on said upper ledge and said upper and lower insulator shoulders to insure a gas-tight seal thus providing an annular air passage between said insulator, said member and said shell, an air inlet connector formed on said upper shell portion, a nozzle positioned in said connector for lowering the pressure of and for metering the air into the annular passage, the annular passage and the air chamber being interconnected, a fuel inlet connector positioned substantially opposite said air inlet connector and being interconnected with said lower shell portion by a stepped bore, a tubular valve plunger slidably positioned within the bore, a sealing gasket positioned on the upper end of said plunger for abutment with a ledge formed within the bore, means provided on said plunger intermediate its ends and in close sliding contact with the bore wall surface to guide said plunger and block the flow of fuel, said tubular plunger being provided with a plurality of ports to enable the fuel to pass from between the plunger and the bore wall to the inner portion of the plunger, the ports being positioned substantially tangential to the inner wall surface of said plunger to enable the separation by centrifugal action of solids present in the fuel, means plugging the lower end of the bore and having a fuel metering nozzle positioned therein, resilient means positioned about the lower end of said plunger and acting on said plugging means to maintain the fuel valve in normally closed position, and a target in line with and spaced from said nozzle to atomize the fuel jet, the stepped bore being formed at such an angle in said shell as to direct the fuel jet inwardly and in a spiral opposite to that of the air streams.

8. In an injector igniter plug, the combination of a tubular metal shell having an upper, lower and intermediate portion, the internal surface of said intermediate portion being stepped with respect to said upper and lower portions to form an upper and lower ledge on the respective ends of said intermediate portion, an insulator having upper and lower shoulders formed thereon positioned within said shell and having a bore therethrough, a center electrode positioned within said bore, said electrode being bifurcated on its lower end to form a pair of legs, the legs of said electrode being spread apart to points adjacent said shell, an igniter ring positioned in the wall of said shell adjacent said legs, a collar positioned on the inner wall surface of said intermediate portion about the lower end of said insulator and having a plurality of vertical knurls formed on its outer surface adjacent its upper end, an outwardly extending annular flange formed on the bottom end of said collar and being provided with a plurality of spaced apart apertures formed therein at an angle such as to direct the air in a plurality of spiralling and inwardly directed streams, a second outwardly extending annular flange formed on said collar at a point intermediate its ends to form a header chamber with said collar, said wall surface and said first-mentioned flange and being provided with a plurality of spaced apart apertures, an annular C spring positioned within said shell and extending between said upper ledge and said lower insulator shoulder, the knurled upper portion of said collar contacting the inner surface of said spring to centralize said spring in said shell, the upper end of said shell being crimped onto said upper insulator shoulder to stress said spring and seal said insulator within the shell to form an annular air passage between said insulator, said spring and said shell, a sealing gasket provided on said upper ledge and said upper and lower insulator shoulders to insure the integrity of the seal, an air inlet boss formed on said upper shell portion, a calibrated orifice plate positioned in said boss for dropping the pressure of and for metering the air into the annular passage, said passage and said chamber being interconnected, a fuel inlet boss positioned on said shell and being interconnected with said lower shell portion by a stepped bore through said shell having the small diameter portion adjacent said boss, a tubular valve plunger open at its lower end and slidably positioned within the bore, a guide stem having a plurality of spaced vertical flats formed on the upper end of said plunger and being slidably positioned within said small diameter bore portion to guide said plunger and to permit the flow of fuel thereto, a sealing gasket positioned on the upper end of said plunger for abutment with a ledge formed within the bore, an annular flange formed on said plunger intermediate its ends and in close sliding contact with the bore wall surface to guide said plunger and block the flow of fuel, a second annular flange spaced from the bore wall surface and formed on said plunger between the upper end thereof and said first-mentioned flange for filtering out solid particles present in the fuel, said tubular plunger being provided with a pair of ports to enable the fuel to pass from between said plunger flanges to the inner portion thereof, the ports being positioned substantially tangential to the inner wall surface of said plunger to enable the separation by centrifugal action of solids remaining in the fuel, a plug in the lower end of the bore having a fuel metering tube positioned centrally therein, a spring acting between said plug and said plunger to maintain the plunger in normally closed position, and a target in line with and spaced from said tube to atomize the fuel jet, the stepped bore being formed at such an angle in said shell as to direct the fuel jet inwardly and in a spiral opposite to that of the air streams.

9. In a device of the type disclosed, the combination of a shell, an insulator having a bore therethrough positioned within and in gas-tight relationship with said shell to form an air passage therewith, a center electrode positioned within said bore, means forming an air chamber within and intermediate the ends of said shell, said means being adapted to inject a plurality of spiralling air streams into the lower portion of said shell, an air inlet positioned on said shell and having means for depressuring and metering the air into the passage, the passage and chamber being interconnected, said first-mentioned means being adapted to by-pass a portion of the air about the insulator for quenching the flame surrounding the insulator.

10. In a device of the type disclosed, the combination of a shell, an insulator having a bore therethrough positioned within and in gas-tight relationship with said shell to form an air passage therewith, a center electrode positioned within said bore, means forming an air chamber within and intermediate the ends of said shell, said means being adapted to inject a plurality of spiralling air streams into the lower portion of said shell, an air inlet positioned on said shell and having means for depressuring and metering the air into the passage, the passage and chamber being interconnected, a fuel inlet positioned on said shell, valve means interconnected with said fuel inlet in such position as to inject the fuel stream into said shell in a spiral opposite to that of said air streams, means in said valve for metering the flow of fuel therefrom, and filtering means for removing solids from the fuel.

11. In an injector igniter plug of the type described, the combination of a shell, an insulator having a bore therethrough positioned within and in gas-tight relationship with said shell, a center electrode positioned within said bore, a fuel inlet on said shell, valve means including a valve plunger within a valve bore between said fuel inlet and the inner wall surface of said shell interconnected with said fuel inlet, said valve means being positioned within the wall of said shell to inject a spiralling fuel stream into said shell, means in said valve metering the flow of fuel therefrom, and means formed integrally with said valve plunger for removing solids from the fuel.

12. In a device of the type disclosed, the combination of a shell, an insulator having a bore therethrough positioned within and in gas-tight relationship with said shell, a center electrode positioned within said bore, a collar positioned on the inner wall surface of said shell and intermediate its ends to form an air chamber therewith, said collar being provided with a plurality of spaced apertures to inject air into the lower portion of said shell, an air inlet provided on said shell having interconnection with said collar, a fuel inlet positioned on said shell, valve means including a fuel outlet connected with said fuel inlet to inject the fuel stream into said shell in such manner as to produce a mixture thereof with the air streams.

13. In a device of the type disclosed, the combination of a shell, an insulator having a bore therethrough positioned within and in gas-tight relationship with said shell, a center electrode positioned within said bore, a collar positioned on the inner wall surface of said shell and intermediate its ends to form an air chamber therewith, a pair of vertically spaced apart and generally outwardly extending annular flanges formed on the outer surface of said collar cooperating with the inner wall surface of said shell to form said air chamber, said collar being provided with a plurality of spaced apertures to inject a plurality of air streams into the lower portion of said shell, an air inlet provided on said shell having interconnection with said collar, a fuel inlet positioned on said shell, valve means including an outlet nozzle connected with said fuel inlet to inject the fuel stream into said shell in such manner as to produce the turbulent intermixture thereof with the air streams.

14. The device as set forth in claim 13 wherein said collar is adapted to bypass a portion of the air about said insulator in order to maintain said insulator at a lower operating temperature.

References Cited in the file of this patent

UNITED STATES PATENTS

| | | |
|---|---|---|
| 2,032,986 | Howell et al. | Mar. 3, 1936 |
| 2,292,409 | Steward | Aug. 11, 1942 |
| 2,459,286 | Rabezzana et al. | Jan. 18, 1949 |
| 2,525,207 | Clarke et al. | Oct. 10, 1950 |
| 2,545,546 | Fisher | Mar. 20, 1951 |

FOREIGN PATENTS

| | | |
|---|---|---|
| 686,131 | Great Britain | Jan. 21, 1953 |